United States Patent [19]

Matsubara

[11] Patent Number: 4,553,446
[45] Date of Patent: Nov. 19, 1985

[54] CONTROL DEVICE
[75] Inventor: Yoshitaka Matsubara, Osaka, Japan
[73] Assignee: Kubota, Ltd., Osaka, Japan
[21] Appl. No.: 547,529
[22] Filed: Oct. 31, 1983
[30] Foreign Application Priority Data
Jun. 11, 1983 [JP] Japan .................................. 58-89348
[51] Int. Cl.[4] .............................................. G05G 9/00
[52] U.S. Cl. ................................ 74/471 R; 137/637.1
[58] Field of Search .................... 137/637.1; 74/471 R
[56] References Cited
U.S. PATENT DOCUMENTS
2,935,890  5/1960  Hull .................................... 74/471 R
3,211,013  10/1965  Quesinberry ................. 137/637.1 X
4,482,115  11/1984  Lassiter, Jr. .................. 74/471 R X FOREIGN PATENT DOCUMENTS
2122297  1/1984  United Kingdom ............ 74/471 R Primary Examiner—A. Michael Chambers
Assistant Examiner—John C. Fox
Attorney, Agent, or Firm—Edwin E. Greigg

[57] ABSTRACT

A control device capable of selectively controlling either one of two controlled members with the use of one control means.

The control device incorporates a link and a lock member. The pivot structure of an arm between the link and the control means is improved, thereby to provide a smooth swing of the link.

1 Claim, 5 Drawing Figures

CONTROL DEVICE

BACKGROUND OF THE INVENTION

The present invention relates to a control device capable of selectively controlling either one of two controlled members with the use of one control means. Such control device includes two controlled members to be slidingly controlled substantially in parallel to each other, a swing link connecting these controlled members to each other, a lock member adapted to selectively lock either one of the controlled members for preventing the same from being slided, and a control means for swinging the link around its swing axis with respect to the controlled member locked by the lock member, so as to slide the other non-lock controlled member.

FIG. 5 illustrates a conventional control device of the type above-mentioned, which comprises controlled members 13 and 14, a link 12 disposed at one end side of the controlled members 13 and 14 and connecting the same to each other through pins 15a and 15b, a pin 11 projected from the link 12 in the opposite direction to the controlled members 13 and 14, a rod 6 interlocked with a control means 5 and connected to the pin 11, and a lock member 17 adapted to be engaged with either one of the controlled members 13 and 14 while the link 12 is swung by the control means 5 to slide the other controlled member 14 or 13.

In such construction, the axis $P_6$ of the rod 6 is separated with a relatively large distance l from an imaginary plane S passing through the axes $P_3$ and $P_4$ of the controlled members 13 and 14. Accordingly, when the rod 6 is pushed or pulled, there is generated an external force by which the link (12) tends to swing the pins 15a and 15b with respect to the controlled members 13 and 14.

In order to facilitate the manufacture, there are originally formed gaps among the link 12, the controlled members 13 and 14 and the pins 15a and 15b, and their relative rotation during operation further increase such gaps. This causes the link 12 and the pins 15a and 15b to be swung during operation. Due to such swing, the operational gap of the control means is disadvantageously increased to make operation difficult.

SUMMARY OF THE INVENTION

In view of the foregoing, it is an object of the present invention to provide a control device in which, in spite of gaps between a link and controlled members, the operational gap of the control means is decreased to improve the manoeuvrability.

In order to achieve the object above-mentioned, the present invention provides a control device having two controlled members to be slidingly controlled subtantially in parallel to each other, a swing link connecting these controlled members to each other, a lock member adapted to selectively lock either one of the controlled members for preventing the same from being slided, and a control means for swinging the link around its swing axis with respect to the controlled member locked by the lock member so as to slide the other non-lock controlled member.

The present invention is characterized by comprising: an arm between the control means and the link having one end swingingly mounted at a fixed support shaft and extending in the longitudinal direction of the link; a first pin secured to the arm at its longitudinally intermediate portion, the link rotatably connected at its intermediate portion to the first pin; a second pin secured to the free end of the arm; a rod interlocked with the control means and rotatably connected to the second pin.

The present invention is further characterized in that the controlled members and the link are connected to each other with the controlled members held by the link or the link held by the controlled members, and in that the rod is located such that its axis is brought near to an imaginary plane passing through the axes of the both controlled members.

According to the present invention, no restrictions are imposed on the engagement length of the fixed support shaft and the arm by the interlocking construction, and therefore such length can be lengthened sufficiently. The operational gap of the arm can be therefore greatly reduced.

Furthermore, the first and second pins are secured to the arm, and therefore can be operated integrally therewith, thereby to mostly eliminate the operational gap between the rod and the first pin. The controlled members and the link are connected to each other with the controlled members held by the link or the link held by the controlled members. This enables the axes of the controlled members to be brought near to the link axis. The rod is located such that its axis is adjacent to an imaginary plane passing through the axes of the controlled members.

As shown in FIG. 4, located on or adjacent to an imaginary plane S are the rod axis $P_6$, the working axis $P_9$ of the first pin 11 with respect to the link 12, the working axes $P_{10}$ and $P_{11}$ of the link 12 with respect to the controlled members 13 and 14, and the axes $P_3$ and $P_4$ of the controlled members 13 and 14. Accordingly, in spite of the gap between the arm 8 and the fixed support shaft 7, the gap between the first pin 11 and the link 12, and the gaps between the link 12 and the controlled members 13 and 14, the operational gap of the control means 5 with respect to the controlled members 13 and 14 can be greatly reduced as compared with the conventional construction in FIG. 5, thereby to greatly improve the manoeuvrability in an efficient manner.

BRIEF DESCRIPTION OF THE DRAWINGS

FIG. 1 is a side view of a back hoe working vehicle incorporating the control device in accordance with the present invention.

FIG. 2 is a plan view, with portions broken away, of main portions of the vehicle in FIG. 1.

FIG. 3 is a view taken along the line III—III in FIG. 2.

FIG. 4 is a block diagram illustrating how the main portions are arranged.

DESCRIPTION OF THE PREFERRED EMBODIMENTS

Figure 1:
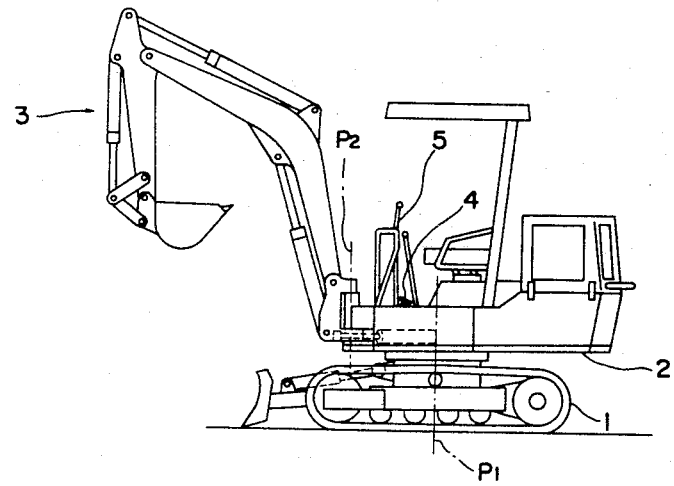
FIGS. 1 to 4 illustrate an embodiment of control device in accordance with the present invention.
Figure 5:
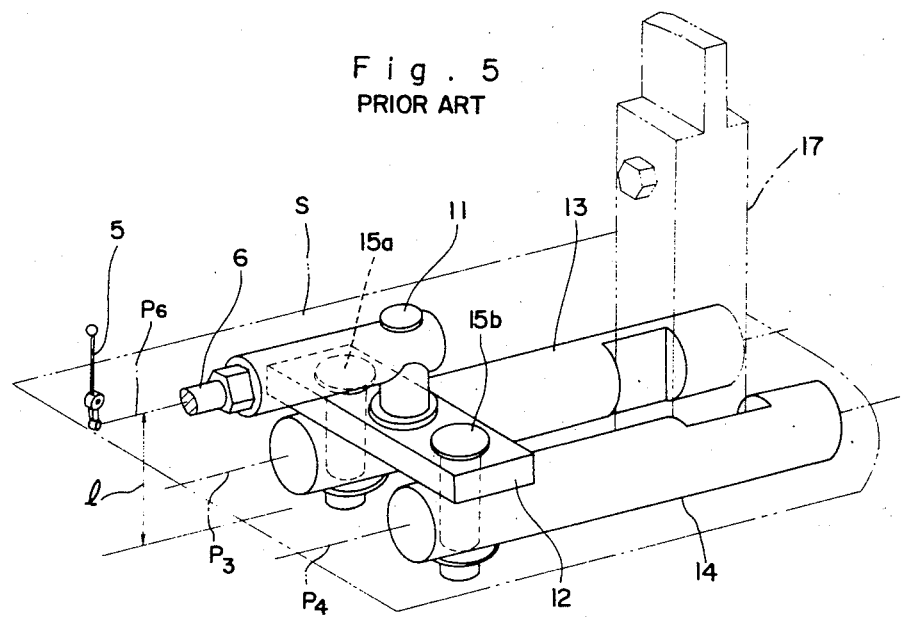
FIG. 5 is a perspective view of main portions of prior art.

As shown in FIG. 1, the operator on a seat may selectively control a swivel valve or a swing valve with a control means 5 through a pedal 4 for rotating a swivel stand 2 around a longitudinal axis $P_1$ with respect to a travelling device 1 and a back hoe device 3 around a longitudinal axis $P_2$ with respect to the swivel stand 2.

The description hereinafter will discuss how the back hoe working vehicle of the present invention is constructed and operated, with reference to FIGS. 2 and 3.

A rod 6 to be pushed and pulled with swing of the control means 5 is interlocked, through the second pin 9 and a ball joint 10 secured to the arm 8, with the free end of the arm 8 swingingly mounted to the fixed support shaft 7. The link 12 is rotatably attached to the first pin 11 which is secured to the arm 8 at its intermediate portion in the longitudinal direction, such that the link 12 is rotatable with respect to the first pin 11 and extends in the longitudinal direction of the arm 8.

Two controlled members 13 and 14 to be slidingly controlled substantially in parallel to each other, are connected to the swing link 12 respectively by pivot pins 15a and 15b at the both sides with respect to the first pin 11. The link 12 is held by the controlled members 13 and 14 such that the axes $P_3$ and $P_4$ of the controlled members 13 and 14 intersect or are brought near to the axis $P_5$ of the link 12.

The rod 6 is located such that its axis $P_6$ is brought near to the imaginary plane S passing through the axes $P_3$ and $P_4$ of the controlled members 13 and 14. The pivot pins 15a and 15b are secured to the controlled members 13 and 14 by bolts 16.

The controlled members 13 and 14 are respectively connected to a swivel valve $V_1$ and a swing valve $V_2$ such that the axes $P_3$ and $P_4$ of the controlled members 13 and 14 are aligned or substantially aligned with the centers of the valve spools.

Pulling and pushing of one controlled member 13 or the other controlled member 14 respectively permit the swivel stand 2 or the back hoe device 3 to be forwardly and reversely rotated and stoped.

The controlled members 13 and 14 have notches 13a and 14a, respectively, which face to each other. A lock member 17 is selectively engaged with the controlled member 13 or 14 while swinging upon actuation of the pedal 4. The control means 5 swings the link 12 around its swing axis $P_7$ or $P_8$ with respect to the controlled member 13 or 14 which is locked by the lock member, thereby to slide the other non-lock controlled member 14 or 13. Thus, the swivel 2 or back hoe device 3 is rotatingly operated.

Figure 2:
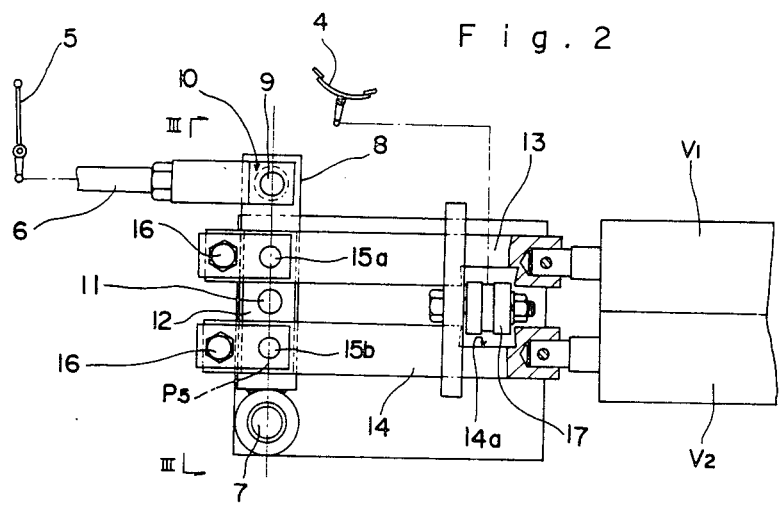
Figure 3:
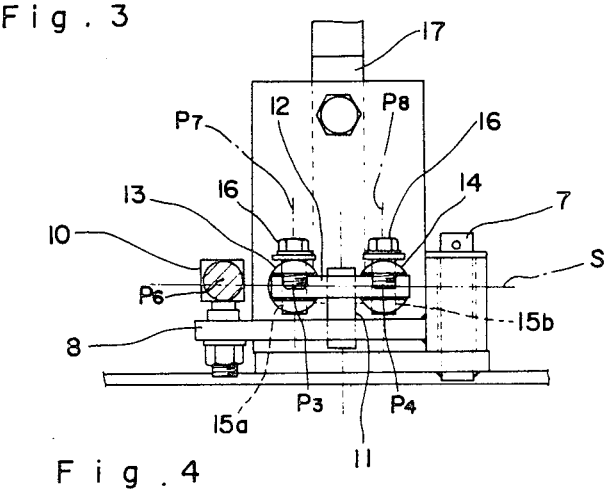
Figure 4:
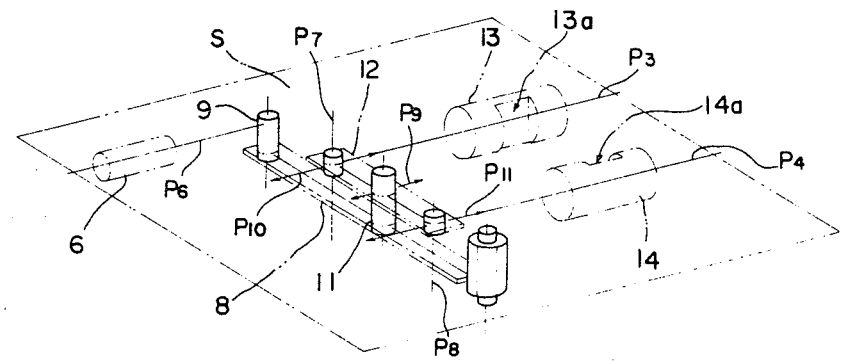

As apparent from FIG. 2, the second pin 9, the swing axis $P_7$, the first pin 11, the other swing axis $P_8$ and the fixed support shaft 7 are located on a straight line in a plan view when the control means 5 is located at a neutral position.

It is a matter of course that the present invention may be embodied in every way. Namely, the control means may be of the pedal or push-pull type and may be variously modified in construction. Also, various modifications may be made of the mechanism for interlocking the rod 6 with the control means 5 and the arm 8, the mechanism for interlocking the link 2 with the controlled members 13 and 14, and the mechanism for respectively interlocking the controlled members 13 and 14 with the valves $V_1$ and $V_2$. For example, the rod 6 and the arm 8 may be connected by a simple pin structure, or the link 12 may hold the controlled members 13 and 14.

The present invention may also be applied to control devices in construction machines and agricultural machines of every kind.

I claim:

1. A control device comprising a control arm,
   one end of said control arm being pivoted about a fixed support shaft,
   a control means including a rod pivotably secured at one end thereof to the opposite end of said control arm,
   a first pin secured to said control arm at a mid-point linearly of said control arm and extending perpendicular thereto,
   a swing link positioned above said control arm and pivotably secured on said first pin at the midsection of said swing link,
   first and second control members spaced from each other and secured parallel with each other,
   said first control member pivotably connected at one end thereof to one end of said swing link and pivotably connected at its other end to a first hydraulic control valve for operation thereof,
   said second control member pivotably connected at one end thereof to the opposite end of said swing link a distance from said first pin equal to said pivotable connection of said first control member and pivotably connected at its other end to a second hydraulic valve for operation thereof,
   a lock member positioned between said first and second control members and adapted to selectively lock one of said first and second control members in a fixed position while permitting parallel movement of the non-locked control member,
   said swing link being positioned parallel with said control arm with their linear axis in the same vertical plane when said first and second control members and said control means are in their neutral position,
   whereby a central axis of said rod, said swing link and a central axis of said first and second control members are located substantially on a single plane.

* * * * *